United States Patent [19]

Rupp

[11] 4,417,299

[45] Nov. 22, 1983

[54] FISHING POLE LIGHT

[76] Inventor: John W. Rupp, 3131 Central Ave., Spring Valley, Calif. 92077

[21] Appl. No.: 360,219

[22] Filed: Mar. 22, 1982

[51] Int. Cl.³ .............................................. F21L 7/00
[52] U.S. Cl. ................................... 362/186; 362/109;
362/119; 362/120; 362/190; 362/191; 362/202;
362/204; 362/205; 362/206; 362/396; 362/800
[58] Field of Search ............... 362/186, 109, 119, 120,
362/190, 191, 202, 204, 205, 206, 396, 800

[56] References Cited

U.S. PATENT DOCUMENTS

| 2,671,209 | 3/1954 | Habib | 362/120 |
|---|---|---|---|
| 3,340,390 | 9/1967 | Imre | 362/205 X |
| 4,177,500 | 12/1979 | Nicholl et al. | 362/183 X |
| 4,183,076 | 1/1980 | Bodde | 362/191 |

Primary Examiner—Stephen J. Lechert, Jr.
Attorney, Agent, or Firm—Brown & Martin

[57] ABSTRACT

A small portable, lightweight, long life, battery powered light includes fastening means for fastening it near the end of a fishing rod so that a fisherman can see the fishing rod tip move during darkness. The closure cap for the battery compartment forms the switch, and the lens includes light diffusion lines to soften the glow.

7 Claims, 5 Drawing Figures

FISHING POLE LIGHT

BACKGROUND OF THE INVENTION

The present invention relates to a light for use on the end of a fishing rod.

When fishing at night, it is often very difficult to see the end of the fishing rod. Therefore, it is necessary for the fisherman to continually hold the rod in order to detect when a fish starts bumping the bait or strikes. Sometimes the fish will bump the bait or tug on it before striking and the fisherman wants to be prepared to set the hook. The fisherman cannot put his rod down or set it in a holder and relax, because he does not want to lose the opportunity to catch the fish.

Also, baiting a hook with live bait or affixing an artificial lure to the small snap clasp of a leader at night is a problem. The fisherman usually uses a normal size flashlight and tucks it in one armpit while trying to accomplish this task with his hands. This is cumbersome and it is difficult to keep the flashlight positioned properly while handling the bait or the lure.

SUMMARY OF THE INVENTION

The above problems are overcome by an exemplary embodiment of the invention wherein a small, lightweight, portable light using a light emitting diode is powered by small battery means and diffuses light for easy viewing. The light includes switch means and connection means whereby it can be quickly and easily connected to and disconnected from the end of a fishing rod.

DETAILED DESCRIPTION OF THE INVENTION

Figure 1:
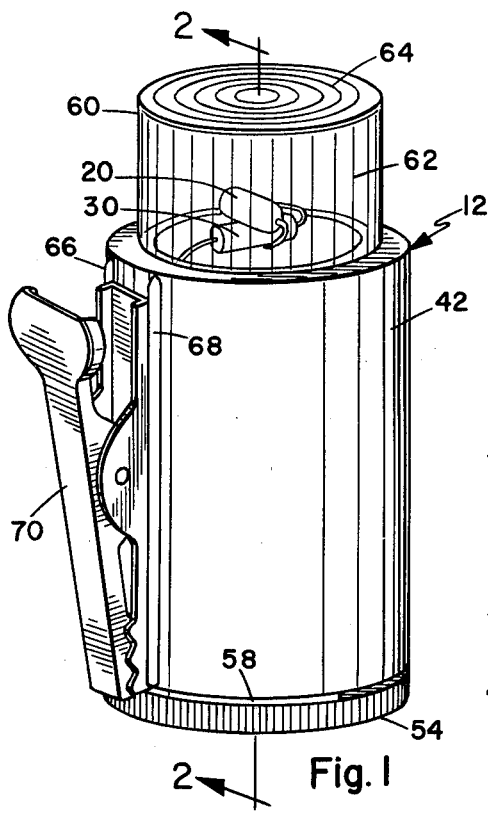
FIG. 1 is perspective view of the complete light unit.
Figure 2:
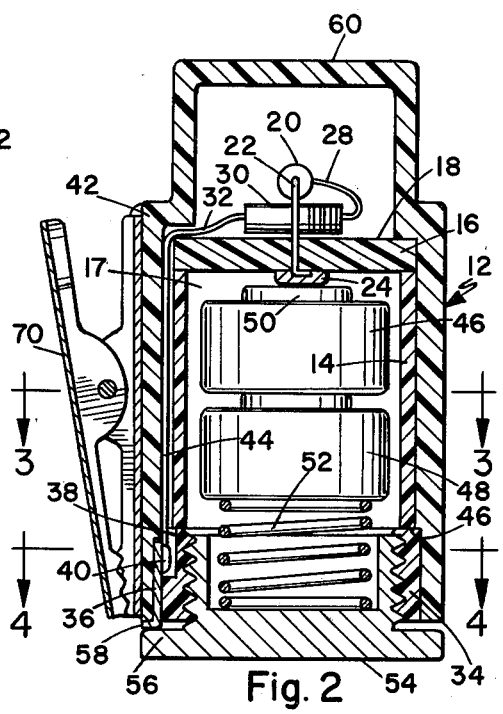
FIG. 2 is a sectional view taken on line 2—2 of FIG. 1.
Figure 5:
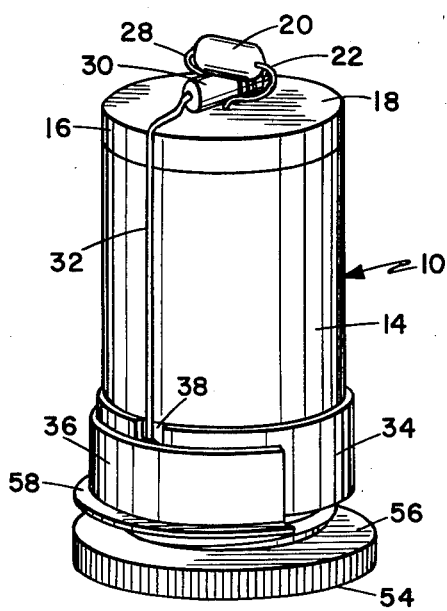
FIG. 5 is a perspective view of the central assembly prior to insertion in the outer case.
Figure 3:
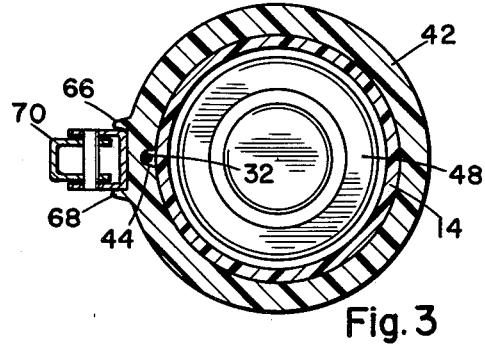
FIG. 3 is a sectional view taken on line 3—3 of FIG. 2.
Figure 4:
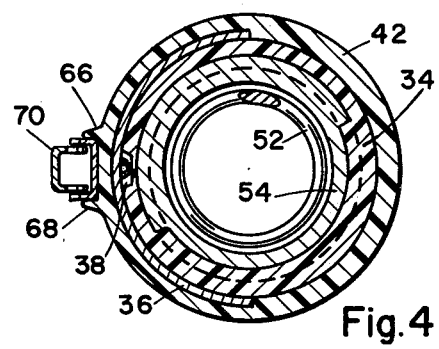
FIG. 4 is a sectional view taken on line 4—4 of FIG. 2.

Referring to the drawings, FIG. 5 shows the central assembly 10 which is put together before insertion in the outer hollow cylindrical case 12 as shown in FIG. 1 and 2. The central assembly 10 includes a hollow plastic cylinder 14 that is closed at one end by a plastic disk 16 (FIG. 2). This forms a battery compartment 17. The disk 16 has a reflective face 18. A light emitting diode 20 is mounted on the face of the disk 16 with one terminal connected to electric lead 22 which extends through a central opening in the disk 16. The end of the electric lead 22 is soldered in place at 24 to form one battery contact. The other terminal of the light emitting diode is connected to electric lead 28 of resistor 20. The other electric lead 32 of resistor 30 extends closely along the outer surface of the cylinder 14.

A plastic ring 34 has a circular metal sleeve 36 of electrically conductive material positioned thereon and affixed thereto with a suitable adhesive. The ring 34 includes a cut out portion 38 to accommodate the end of the resistor lead 32. The resistor lead 32 is soldered at 40 (FIG. 2) to the metal sleeve 36. The central assembly 10 shown in FIG. 5 is now complete.

The outer cylindrical hollow case 12 is formed with a longitudinal groove 44 on the interior surface to accommodate the resistor lead 32 on the exterior of the central assembly 10 when the central assembly 10 is inserted into the hollow outer case 12. The outer case 12 is stepped at 46 to seat the ring 34 and sleeve 36 when the central assembly 10 is inserted into the hollow case 12. The central assembly 10 is inserted into the case 12 and the ring 34 and sleeve 36 are affixed to the case 12 with a suitable adhesive.

Batteries 46 and 38 are inserted into the battery compartment 17 and the positive electrode 50 of battery 46 engages the contact 24. A spring 52 is inserted in the outer case 12 against the bottom and other electrode of battery 48. A metal cap 54 has external threads thereon which engage the internal threads on the ring 34. The cap 54 closes off the battery compartment, creates a platform to compress spring 52 and acts as a switch to turn on the light. When the cap 54 is partially screwed into position, it closes off the battery compartment and the light is off. When it is screwed further into position, the flange 56 on the cap 54 engages the flange 58 on the sleeve 36. The circuit through the batteries 46 and 48 and the light emitting diode 20 is now complete and the light emitting diode 20 is energized.

The outer case 12 has a necked down portion on one end to form a lens 60. The lens 60 has lines 62 in the side wall and circular lines 64 in the face. It has been found that these lines provide light diffusion and create a glow around the lens rather than a glaring light. This makes the light much easier to watch and monitor.

The outer case 12 also includes ribs 66 and 68. A clamp such as alligator clamp 70 is seated between these ribs and is fixed in place with a suitable adhesive. The ribs 66 and 68 help retain the adhesive in place and position the clip 70 when it is being attached.

In use, the light is attached near the end of a fishing rod by opening clamp 70 and engaging it with the fishing rod near the end of the rod or engaging it with the ferrule support arms in the ferrule which is at or near the tip of the rod.

The fishing pole light of the present invention is compact, low in cost of manufacture, and easy to use. Two small 1.5 volt batteries have a long life when used with the light emitting diode. The switch is easy to use. The light is useful when affixing hooks or snaps to the fishing line or when selecting lures or baits. When not in use, it is easily stored in the fishing box and does not occupy much space. It is approximately 1¼ inches long and 0.7 inch in diameter and about ½ ounce in weight with the batteries in place.

Having thus described my invention, I claim:
1. A portable, small, long life, lightweight fishing pole light, comprising:
   a hollow, cylindrical central member of insulating material closed at one end by a disk of insulating material having a reflective outer face with a light emitting diode extending above said face, said light emitting diode having a first electric lead extending from one terminal centrally through said disk and forming a first electrical contact means for contacting one electrode of battery means and a second electric lead extending from the other light emitting diode terminal through a resistor to switch means;

an outer case of insulating material extending over said central member and having at least its forward end portion transparent to provide a lens;

the interior of said hollow central member forming a battery compartment for seating battery means therein;

spring means in said battery chamber for urging said battery means to engage said first electrical contact mena;s cap means for closing said battery chamber;

switch means for completing a circuit between said first electrical contact means and second electrical contact means positioned to contact the other electrode of said battery means; and fastening means on the outer case for fastening said light near the end of a fishing rod;

whereby said light emitting diode is energized by actuating said switch means.

2. A portable, small, long life, lightweight fishing pole light according to claim 1 wherein the second electrical lead extends along the outer surface of said central member towards its opposite end;

a threaded portion is provided at the open end of said central member;

second electrical contact means is positioned adjacent the open end of said central member and connected to said second electrical lead;

a groove is provided in the outer case for accommodating the second electrical lead extending along the outer surface of said central member; and the cap means is metal and has threads for engaging the threads on said central member, said metal cap means having contact flange for engaging said second electrical contact means;

whereby said light emitting diode is energized by screwing said end cap into said outer case against said spring means until said contact flange on said cap engages said second electrical contact means to close the circuit through said battery means, the light emitting diode and the resistor.

3. A portable, small, long life, lightweight fishing pole light according to claim 1 wherein the lens includes diffusion lines along its side wall.

4. A portable, small, long life, lightweight fishing pole light according to claim 1 wherein the lens includes circular diffusion lines in the face thereof.

5. A portable, small, long life, lightweight fishing pole light according to claim 3 wherein the lens is smaller in diameter than the rest of the outer case.

6. A portable, small, long life, lightweight fishing pole light according to claim 1 wherein the fastening means is an alligator clamp.

7. A portable, small, long life, lightweight fishing pole light according to claim 6 wherein the outer case includes a pair of longitudinal ribs for confining said alligator clip.

* * * * *

UNITED STATES PATENT AND TRADEMARK OFFICE
CERTIFICATE OF CORRECTION

PATENT NO. : 4,417,299
DATED : November 22, 1983
INVENTOR(S) : John W. Rupp

It is certified that error appears in the above-identified patent and that said Letters Patent are hereby corrected as shown below:

Column 3, line 9, change "mena;s" to --means;--

Signed and Sealed this

Seventeenth Day of April 1984

[SEAL]

Attest:

GERALD J. MOSSINGHOFF

Attesting Officer          Commissioner of Patents and Trademarks